United States Patent [19]

Kanayama et al.

[11] Patent Number: 4,939,529

[45] Date of Patent: Jul. 3, 1990

[54] METHOD FOR DRIVING AND CONTROLLING LIQUID CRYSTAL AND DEVICE

[75] Inventors: Toshikiyo Kanayama, Kaisei; Kenichi Morimoto, Osaka, both of Japan

[73] Assignee: Fuji Photo Film Co., Ltd., Osaka, Japan

[21] Appl. No.: 14,041

[22] Filed: Feb. 12, 1987

[30] Foreign Application Priority Data

Feb. 20, 1986 [JP] Japan ................. 61-35784

[51] Int. Cl.$^5$ ............... G02F 1/13; H04N 1/21; G01D 9/42
[52] U.S. Cl. .............. 346/108; 346/107 R; 350/332; 358/302
[58] Field of Search ............ 346/108, 1.1, 107 R, 346/160; 364/518, 519; 358/298, 302, 296; 350/332

[56] References Cited

U.S. PATENT DOCUMENTS

| | | | |
|---|---|---|---|
| 4,367,946 | 1/1983 | Varner | 346/107 R |
| 4,449,153 | 5/1984 | Tschang | 346/108 |
| 4,605,972 | 8/1986 | Hatanaka | 358/302 |
| 4,636,807 | 1/1987 | Head | 346/108 |
| 4,636,817 | 1/1987 | Masaki | 346/108 |
| 4,675,702 | 6/1987 | Gerber | 346/107 R |

FOREIGN PATENT DOCUMENTS 60-182421 9/1985 Japan .

OTHER PUBLICATIONS

Optical-Bounce Removal and Turnoff-Time Reduction in Tweisted Nematic Displays, PROC. S.I.D. vol. 22, No. 4 297-299 1981.
Optical-Bounce Removal and Turnoff-Time Reduction in Twisted-Nematic Displays, IEEE Trans. Electron Devices vol. ED-28., No. 6 723-725, Jun. 1981.
Ensemble Averages of Molecular Spherical Tensors TOIM., EESTI, NSV, TEAD., AKAD., FUUS., MAT. (USSR) vol. 22. No. 1 45-53 1973.
Dynamic behavior of twisted nematic liquid-crystal layers in switched fields. J. Appl., Phys. 46(9), 3738-3745 (Sep. 1975) CODEN: Japia.

Primary Examiner—George H. Miller, Jr.
Assistant Examiner—Huan Tran
Attorney, Agent, or Firm—Wenderoth, Lind & Ponack

[57] ABSTRACT

Because the prior art liquid crystal driving control circuit needs shift registers, latch circuits and selectors in a number corresponding to the number of cells in the liquid crystal shutter array, the structure of the circuit inevitably becomes complicated and involves a large number of components to thereby push up the production cost. Since this invention method controls a liquid crystal shutter array with pulse width modulation, image data can be serially converted into the data necessary for switching ON/OFF the driving voltage, and the conversion circuit can be structured with only one system. As this invention method controls opening/closing of the cells with binary pulse width signals in a number corresponding to the number of liquid crystal cells, the structure of the circuit can be simplified and yet efficiency of recording in controlled gradation can be enhanced.

10 Claims, 7 Drawing Sheets

| LATCHED DATA | FR | DV |
|---|---|---|
| 0 | 0 | 0 (V) |
| 0 | 1 | 0 (V) |
| 1 | 0 | +D (V) |
| 1 | 1 | −D (V) |

METHOD FOR DRIVING AND CONTROLLING LIQUID CRYSTAL AND DEVICE

BACKGROUND OF THE INVENTION

This invention relates to a method for driving and controlling liquid crystal which stepwise controls a liquid crystal shutter array to record images on a photosensitive material at half tone and to a device therefor.

Figure 1:
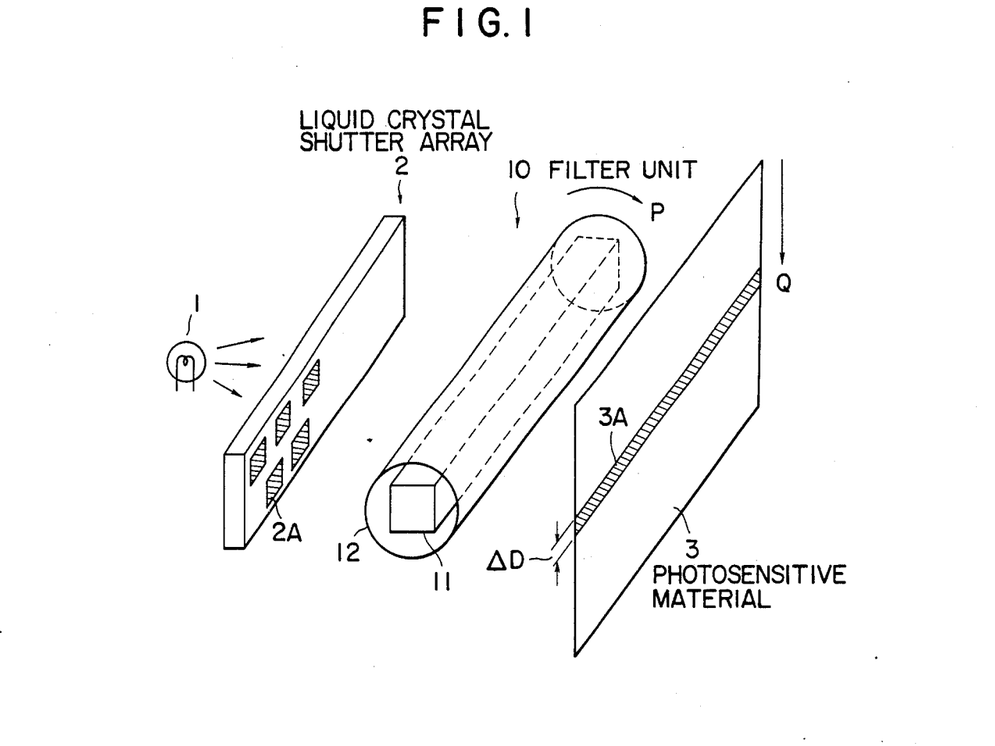
FIG. 1 is a schematic view to show an embodiment of an image recording device using a liquid crystal shutter array to which this invention is applicable.

FIG. 1 is a schematic view of an image recording device using a liquid crystal shutter array to which this invention is applicable wherein light emitted from a light source 1 such as a Halogen lamp is directed onto a liquid crystal shutter array 2 comprising a number of liquid crystal cells 2A of a rectangular shape arranged in line, the light transmitted through opened liquid crystal cells 2A is irradiated onto a photosensitive material 3 via filter unit 10 to expose the photosensitive material 3 at a recording area 3A linearly extending in the width of $\Delta D$. After one line is recorded, the photosensitive material 3 is operatively moved in the direction Q by $\Delta D$ to record another data in the next line in a manner similar to the above.

Figure 2:
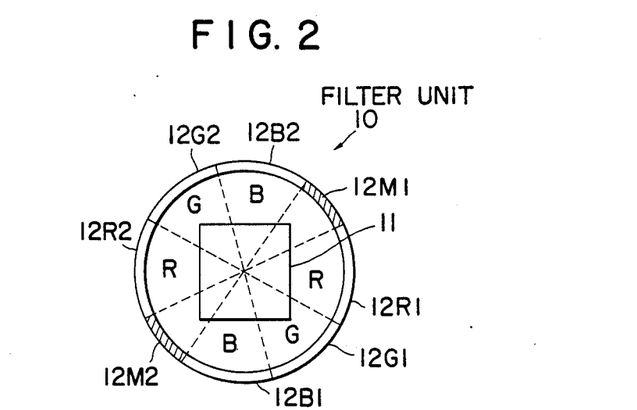
FIG. 2 is a cross sectional view of a filter unit used in the above image recording device.

The filter unit 10 includes a cylindrical filter plate 12 and a Selfoc lens array 11 which is internally held at a center of the cylindrical filter plate 12. FIG. 2 shows the filter unit 10 in brief cross section. The cylindrical filter plate 12 comprises mask members 12M1, 12M2 of a band shape which are arranged symmetrically from a central point to block the light transmitted from the liquid crystal shutter array 2, and band-shaped red filters 12R1, 12R2, green filters 12G1, 12G2 and blue filters 12B1, 12B2 which are respectively arranged symmetrically from the center in the order of red (R), green (G) and blue (B) from the mask members 12M1, 12M2. The Selfoc lens array 11 is fixed inside the cylindrical filter plate 12 in a manner to allow rotation in the direction of, for instance, P around the longitudinal axis of the cylinder. Since the cylinder rotates in the direction P. the light coming through the liquid crystal shutter array 2 is either blocked out by the mask members 12M1 and 12M2 or allowed to pass the R light through the red filters 12R1 and 12R2, the G light through the green filters 12G1 and 12G2 of the B light through the blue filters 12B1 and 12B2. By rotating the cylindrical filter plate 12 suitably, the recording area 3A extending in a linear form on the photosensitive material 3 is consecutively exposed to the R light, G light and B light or is blocked of the light by the mask members 12M1 and 12M2. After one line of recording area on the photosensitive material 3 is exposed to the lights R, G and B, the photosensitive material 3 is moved in the direction Q to expose the next one line of the recording area to the light so that color images on the photosensitive material 3 is completed by repeating the above recording operation one line by one line.

Figure 3:
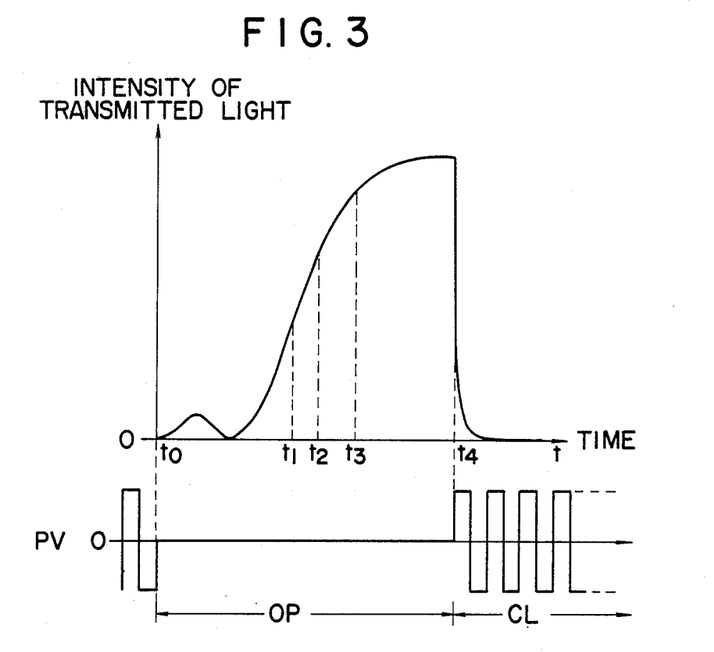
FIG. 3 is a characteristic graph to explain the operation for opening/closing liquid crystal cells of the liquid crystal shutter array which is used in this invention.

The liquid crystal cells 2A of the liquid crystal shutter array 2 have such features that they are closed to prohibit passing of the light therethrough (in other words, the intensity of the light transmitted is zero) when a pulse voltage PV (e.g. 1 KHz) is applied to the liquid crystal cells 2A, while they are open to let the light pass therethrough when no pulse voltage is applied thereto. FIG. 3 shows that a liquid crystal shutter is closed until a time point $t_0$ while it is open between a time point $t_0$ and a time point $t_4$ to let the light pass therethrough. The graph also indicates that while the intensity of the transmitted light increases gradually (the small dip in the curve is indicative of the well known bound phenomenon of the liquid crystal); when the liquid crystal shutter starts to let the light pass, the passage of light instantaneously shut when a pulse voltage PV is applied at the time point $t_4$ and the shutter closes (CL). The intensity of the light which passes through the liquid crystal shutter array 2 to expose the photosensitive material 3 can be controlled by the steps of keeping the pulse voltage PV applied on the liquid crystal cells 2A at zero to open the liquid crystal shutter, keeping the pulse voltage PV at zero at different time points, for example $t_1$, $t_2$, $t_3$, and thereby controlling the time OP during which the liquid crystal shutter is open. In other words, the amount of light which exposes the photosensitive material 3 can be controlled so that the color images can be recorded on the photosensitive material 3 at half tone.

Figure 4:
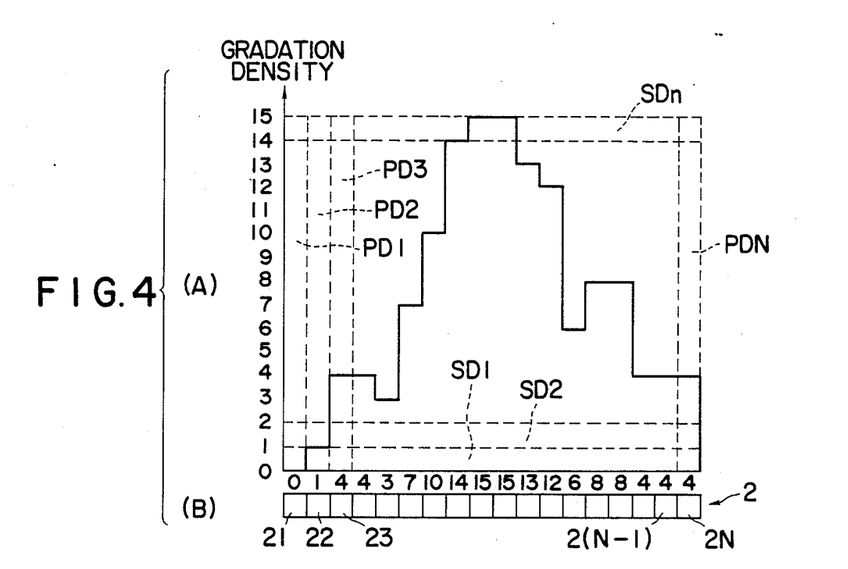
FIG. 4 is a schematic chart to explain the control of the liquid crystal shutter array and gradation control in recording.

Optimally toned images can be recorded by controlling the time period OP during which the liquid crystal shutter is open, or more specifically by applying gradation density signals as shown in FIG. 4 to the liquid crystal shutter array 2. If it is assumed that the liquid crystal cells 2A of the liquid crystal shutter array 2 comprises N number of cells 21, 22, ..., 2 (N−1), 2N, the time during which the liquid crystal cells 21 through 2N are open can be controlled by simply applying the gradation density signals shown in schema (A) of FIG. 4 to each of the liquid crystal cells. FIG. 4 shows an example wherein the images are recorded at the gradation density of 4 bits in the level "0" to "15". The liquid crystal cell 21 opens for "0", if expressed in terms of the gradation density, and the liquid crystal cell 22 opens for "1". Similarly, the liquid crystal cell 2N opens for "4". By applying the pulse voltage signals on the liquid crystal cells 21 through 2N at timings corresponding to the gradation densities as shown in schema (A) of FIG. 4, the time to open the respective liquid crystal cells 2A can be controlled. Since the photosensitive material 3 is exposed with the light transmitted through the liquid crystal cells 21 through 2N, the photosensitive material 3 can be recorded with the images at an optimally adjusted gradation tone.

Figure 5:
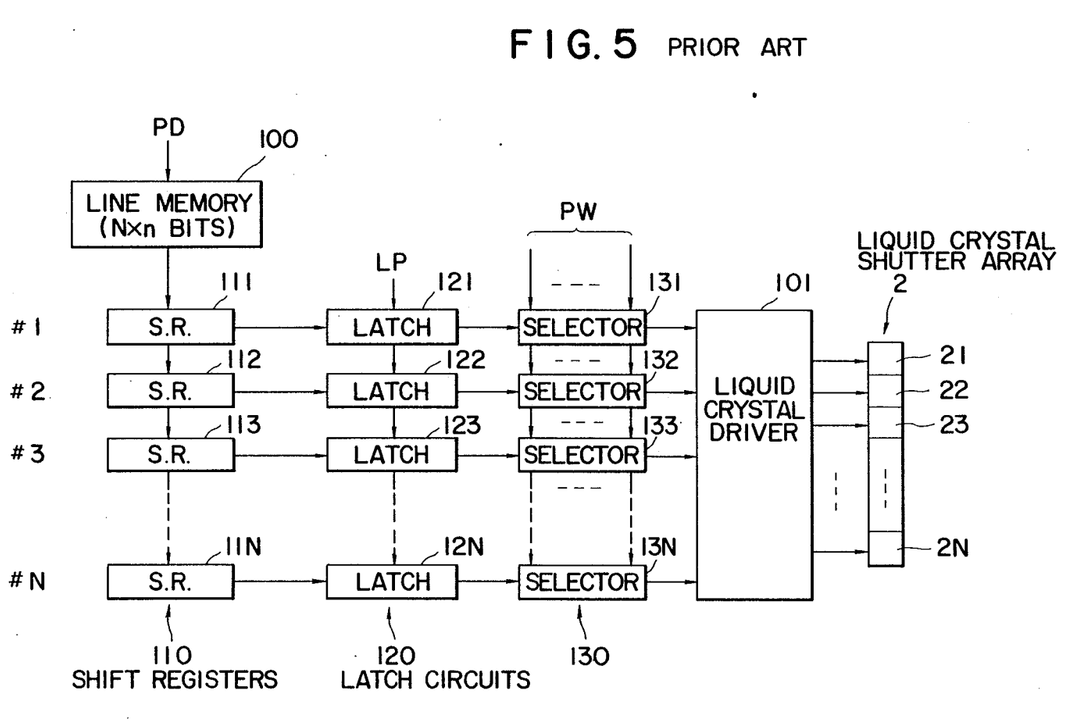
FIG. 5 is a circuit diagram to show an embodiment of a conventional liquid crystal driving control circuit.

FIG. 5 shows a conventional circuit which may be used as a control circuit for recording images at adjusted gradation tone by using the liquid crystal shutter array 2 described above. If the number of the liquid crystal cells 21 through 2N of the shutter array 2 is N, and the number of gradients in output images is n bits, image data PD is stored in a line memory 100 having $N \times n$ bits. The data prepared in correspondence with all the liquid crystal cells 21 through 2N (#1 through #N) in the line memory 100 are respectively transmitted to shift registers 111 through 11N, and the output data therefrom are latched respectively in latch circuits 121 through 12N in synchronism with a latch pulse LP. Selectors 131 through 13N are provided in correspondence to the respective liquid crystal cells 21 through 2N and are supplied respectively with pulse width signals PW signals of the pulse width corresponding to the data (gradation signals) which have been latched in the latch circuits 121 through 12N are operatively selected by the selectors 131 through 13N and fed to a liquid crystal driver 101. The liquid crystal driver 101 then sends the pulse width signals SW selected by the selector 131 through 13N to the liquid crystal cells 21 through 2N of the liquid crystal shutter array 2. Thus, each of the liquid crystal cells 21 through 2N of the shutter array 2 is respectively supplied with signals of the time widths PD1, PD2, PD3, ..., PDN corresponding to the gradation densities as shown in the schema (A) of FIG. 4.

The prior art liquid crystal driving control circuit, however, is detrimental as it requires shift registers 110 (111 to 11N), the latch circuits 120 (121 to 12N) and the selectors 130 (131 to 13N) in the number corresponding to the number of the liquid crystal cells 21 through 2N of the liquid crystal shutter array 2 to inevitably complicate the circuit and push up the production cost.

SUMMARY OF THE INVENTION

This invention was contrived to eliminate aforementioned problems encountered in the prior art and aims at providing a method, and a device therefor, for driving and controlling liquid crystal which can control a liquid crystal shutter array in optical gradation with a higher efficiency and with a simpler structure.

According to one aspect of this invention, for achieving the objectives described above, there is provided a method for driving and controlling a liquid crystal shutter array in order to record an image at adjusted gradation, which comprises the steps of: providing a unit of driving time which is corresponding to predetermined number of gradients in said image and a writing cycle on said liquid crystal shutter array; generating all pixel data out of output data for all pixel of said liquid crystal shutter array at each time which is corresponding to the unit of the driving time; and driving said liquid crystal shutter aray by using said all pixel data so as to record the image.

According to another aspect of this invention, there is provided a liquid crystal drive/control device which controls a liquid crystal shutter array at a writing cycle T comprising liquid crystal cells of N number of record an image of n-bit gradation on a photosensitive material, which comprises an m-notation ($m \leq 2^n - 1$) ring counter (i.e. an M-stage ring counter) which counts a first clock signal and divides said writing cycle T by m, an N-notation ring counter (i.e. an N-stage ring counter) which counts a second clock signal, a line memory of $N \times n$ bits which uses an output from the N-notation ring counter as address signals, a comparator which compares an image data outputted from the line memory with an output from the m-notation ring counter and outputs binary data in accordance with a comparison result therein, an N-bit shift register which receives as input said binary data in synchronism with said second clock signal and a driving circuit which feeds in parallel output from the N-bit shift register to said liquid crystal cells in the number N for driving the same.

Further, according to still another aspect of this invention, there is provided a liquid crystal drive/control device which controls a liquid crystal shutter array at a writing cycle T comprising liquid crystal cells of N number to record an image of n-bit gradation on a photosensitive material, which comprises an m-notation ($m \leq 2^n - 1$) ring counter which counts a first clock signal and divides said writing cycle T by m, an N-notation ring counter which counts a second clock signal, a line memory of $N \times n$ bits which uses an output from the N-notation ring counter as address signals, a data table which is accessible with an image data outputted from the line memory and an output from said m-notation ring counter, an N-bit shift register which receives as input data outputted from said data table, and a driving circuit which feeds in parallel output from the N-bit shift register to said liquid crystal cells in the number N for driving the same.

The nature, principle and utility of the invention will become more apparent from the following detailed description when read in conjunction with the accompanying drawings.

DESCRIPTION OF THE PREFERRED EMBODIMENTS

According to this invention, signals to be recorded are stored as SD1, SD2, ..., SDn in correspondence to the data on gradation density of n bits before being applied to respective liquid crystal cells 21 through 2N of the liquid crystal shutter array 2, as shown in schema (A) of FIG. 4. More particularly, the writing cycle for one pixel in correspondence to the liquid crystal cells 21 through 2N is denoted as T. In order to convert the image data PD of n bits for opening/closing the liquid crystal cells 21 through 2N for the time period T/m (the time obtained by dividing T by m)$\times$N into the data for switching ON or OFF the electric voltage on all the data once every T/m, time data TM is generated with a clock signal CK1 of the cycle T/m from the time when the writing cycle T for one pixel starts. The image data PD and time information TM are compared in amount and converted to the data for switching ON/OFF the voltage in order to control pulse number modulation.

Figure 6:
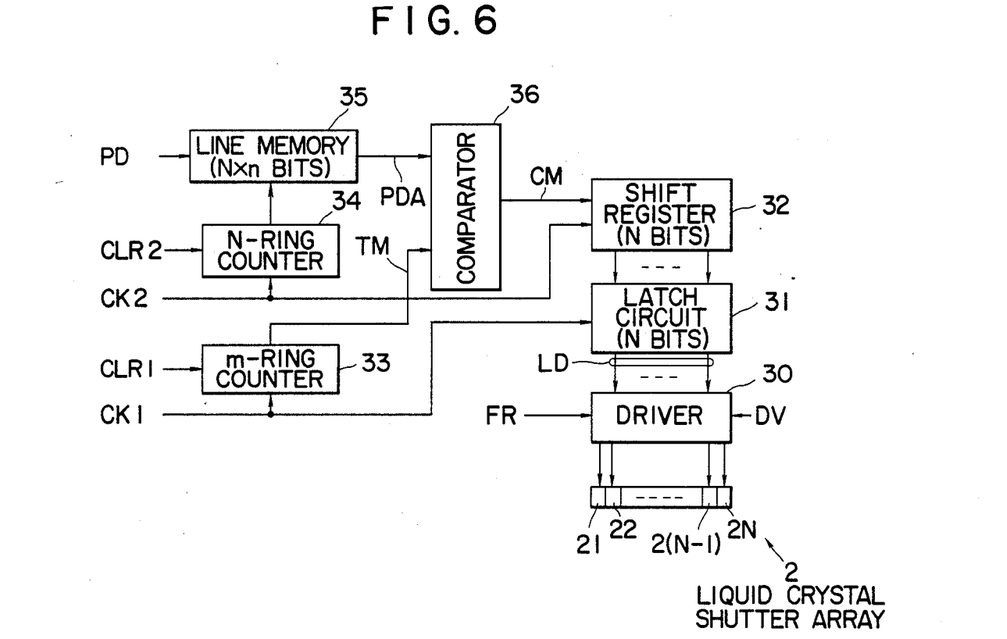
FIG. 6 is a circuit diagram to show an embodiment of this invention circuit structure.

FIG. 6 shows an embodiment of a drive and control circuit according to this invention wherein a clock signal CK1 which is synchronized with the number T/m is inputted to an m-notation ring counter 33 and a latch circuit 31 of N bits, the m-notation ring counter 33 is cleared with a clear signal CLR1 which is inputted in synchronization to the writing cycle T, and the time information TM outputted from the m-rotation ring counter 33 is inputted to a comparator 36. A clock signal CK2 (>CK1), which is outputted in a predetermined number during the period when the writing cycle T is divided by m, is respectively inputted to an N-notation ring counter 34 and a shift register 32 of N bits, the N-notation ring counter 34 is cleared with a clear signal CLR2 which is inputted once ever T/m, the output from the N-notation ring counter 34 is inputted as a memory address to a line memory 35 of N×n bits, and the image data PD is stored in correspondence to the address. The output PDA from the line memory 35 is inputted to the comparator 36 to be compared with the time information TM in amount. If the time information TM is larger than the image data PDA, the output CM thereof is outputted as "H", and if the time information TM is smaller than the image data PDA, the output CM is outputted as "L". The binary output CM thus obtained is inputted to a shift register 32. The data CM of N bits corresponding to the number N of the liquid crystal cells 21 to 2N is inputted to the shift register 32, the parallel outputs therefrom are latched respectively by the latch circuit 31, the latch data LD are sequentially outputted via a driver 30 as binary data parallel to the liquid crystal cells 21 to 2N as shown by SD1, SD2, ..., SDn in FIG. 4 in synchronism with a clock signal FR which is coincidental to the frequency for liquid crystal driving.

Figure 7:
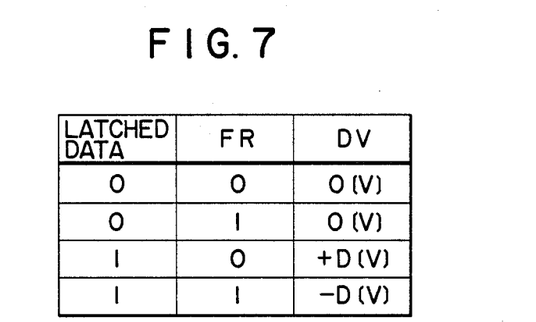
FIG. 7 is a data table to explain examples of the operation in driving.

Driving voltages DV (O,±D) are applied to the driver 30, and the driving voltages DV has the relation shown in FIG. 7 with the latched data LD from the latch circuit 31 and the clock signal FR inputted to the driver 30.

An example of operation of the circuit having the above structure will now be described referring to the time charts shown in FIGS. 8A through 8H.

Figures 8A, 8B:
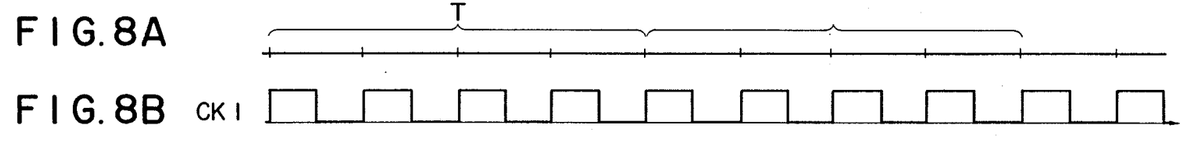
FIGS. 8A through 8H are time charts to show an example of operation in FIG. 6.
Figure 8C:
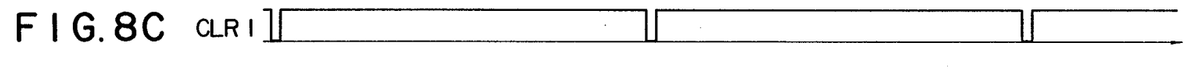
Figure 8D:
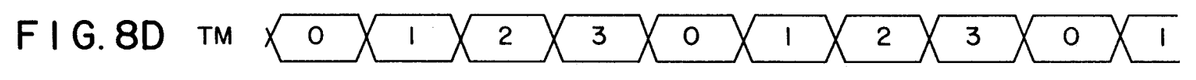
Figure 8E:
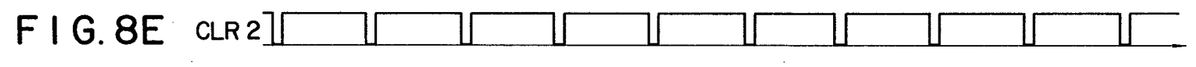
Figure 8F:
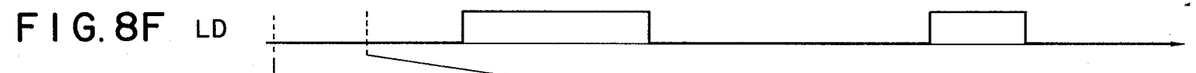
Figure 8G:
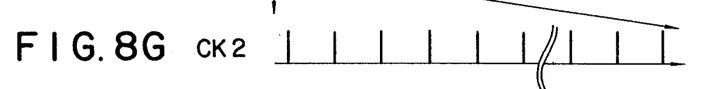
Figure 8H:
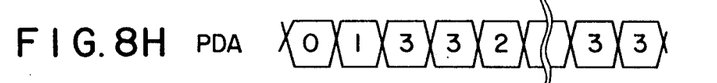

The clock signal CK1 is inputted to the m-notation ring counter 33 (in this case m=4) in synchronism with T/4 as shown in FIG. 8B. The output therefrom or the time information TM is outputted in synchronism with the writing cycle T in the form of "0", "1", "2" and "3", or in other words, in synchronism with the clear signal CLR1 and inputted to the comparator 36 as shown in FIG. 8D. The clock signal CK2 of high frequency which is outputted during the period T/4 is counted by the N-notation ring counter 34, and inputted to the line memory 35 as a memory address, and the image data PDA from the line memory 35 is inputted to the comparator 36 as shown in FIG. 8H. The comparator 36 compares the time information TM with image data PDA and, if the image data PDA becomes larger than the time information TM, inputs the output CM therefrom as "H" to the shift register 32 sequentially. If the image data PDA becomes smaller than the time information TM, the comparator 36 inputs it as "L". Therefore, the shift register 32 sequentially stores N-bit data for each of the liquid crystal cells 21 through 2N in the form of SD1, SD2, ..., SDn as shown in FIG. 4. The N-bit data SD1 through SDn stored in the shift register 32 for one line are latched by the latch circuit 31 in synchronism with the clock signal CK1 and are inputted in parallel to the driver 30 as latched data LD. Then, the driver 30 outputs parallel data in synchronism with the clock signal FR. The clock signal FR may be synchronized with the clock signal CK1. With the clock signal FR and the latched data LD, the driver 30 feeds the liquid crystal cells 21 through 2N of the liquid crystal shutter array 2 with the data on the driving voltages DV as parallel signals in the relation shown in the data table in FIG. 7. Since signals outputted from the driver 30 to be applied to the liquid crystal cells 21 through 2N are corresponding to each line SD1, SD2, ..., SDn as shown in FIG. 4, if the output of the signals is sequentially repeated from "0" to "$2^n-1$", the image signals expressed in terms of gradation can be fed to the respective liquid crystal cells 21 through 2N. This in turn can control the time for opening the liquid crystal cells 2A of the liquid crystal shutter array 2 in accordance with the gradation whereby it is possible to record the images at half tone with the photosensitive material 3.

Figure 9:
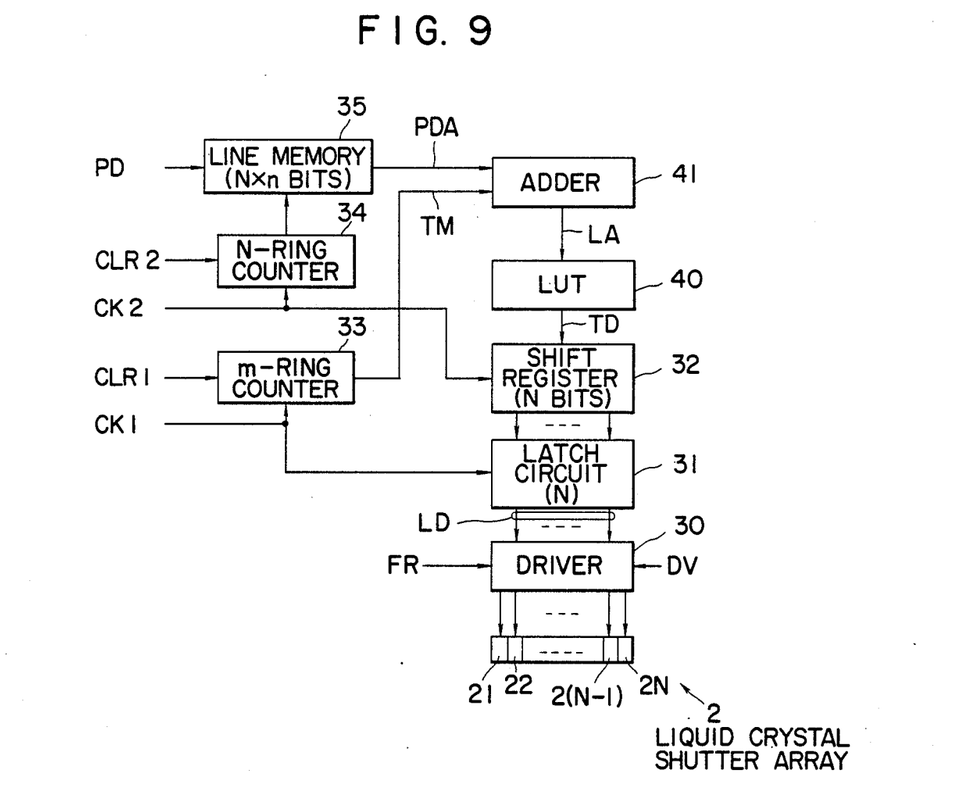
FIG. 9 is a circuit diagram to show another embodiment of this invention.
Figure 10:
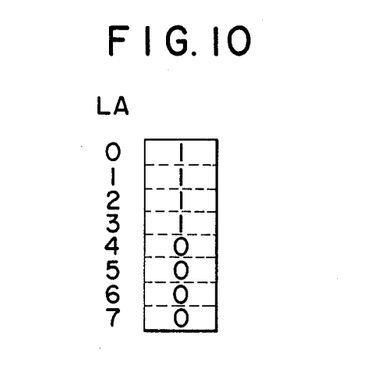
FIG. 10 is a chart to describe the relation between input/output in a look-up table for the circuit in FIG. 9.

FIG. 9 shows a circuit structure of another embodiment of this invention wherein image data PDA from a line memory 35 and time information TM from an m-notation ring counter 33 are operatively added by an adder 41, the added data LA in the adder 41 is outputted therefrom as an address signal of a look-up table 40, and the look-up table 40 stores data in the relation as shown in FIG. 10. The data TD read out from the look-up table 40 is inputted to a shift register 32 of N bits to control opening/closing of the liquid crystal shutter array 2 in a manner similar to the one shown in FIG. 6.

FIGS. 11A through 11F show examples of operation in the circuit shown in FIG. 9 to achieve the effect similar to the first embodiment.

Figures 11A, 11B:
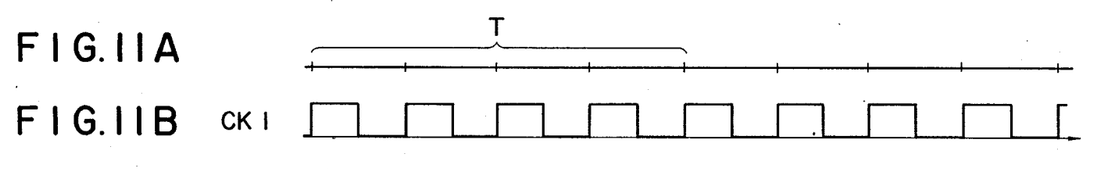
FIGS. 11A through 11F are time charts to show examples of operation of the circuit in FIG. 9.
Figure 11C:
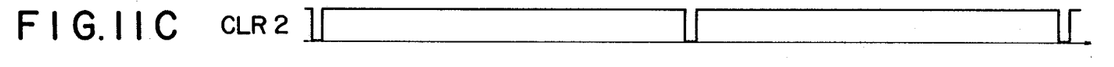
Figure 11D:
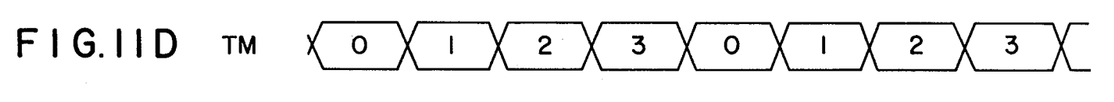
Figure 11E:
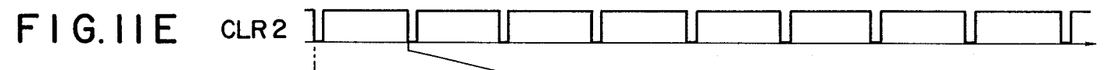
Figure 11F:
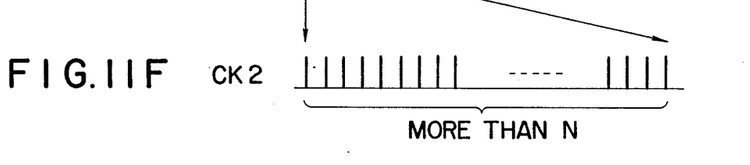

The line memory 35 outputs the image data PDA similar to the above, the m-notation ring counter 33 outputs the time information TM at the timing shown in FIG. 11D, and they are added in the adder 41. When the image data PDA is at the levels "0" through "3", the added data LA will be at "0" through "7". The data TD is outputted in the form of binary pulse width signal in accordance with the table in FIG. 10. The pulse width signal TD is inputted in parallel to the shift register 32 of N bits and fed to the latch circuit 31 and the driver 30 to drive the liquid crystal shutter array 2 in the manner similar to the above. Since the shift register 32 stores data for each of the lines SD1, SD2, ..., SDn as shown in FIG. 4 for output, the images at half tone can be recorded on the photosensitive material 3.

Although the writing cycle T is divided by "4" (m=4) in the above embodiment, the divider m may be any arbitrary number. Although in the above embodiments a line memory, ring counters, an adder, a shift register and a latch circuit are structured discretely, they may be structured in a single large scale integrated circuit (LSI).

As described in the foregoing, this invention method controls a liquid crystal shutter array with pulse width modulation. This enables serial conversion of image data into the data necessary for switching ON/OFF driving voltages for the liquid crystal shutter array, construction of the conversion circuit with only one system, and utilization of general purpose crystal drive LSIs. This invention method can record images in adjusted gradation simply and effectively as the method controls opening/closing of the liquid crystal cells with binary pulse width signals in a number corresponding to the number of liquid crystal cells.

It should be understood that many modifications and adaptations of the invention will become apparent to those skilled in the art and it is intended to encompass such obvious modifications and changes in the scope of the claims appended hereto.

What is claimed is:

1. A liquid crystal drive/control device which controls a liquid crystal shutter array at a writing cycle T comprising liquid crystal cells of N number to record an image of n-bit gradation on a photosensitive material, which comprises an m-notation ($m \leq 2^n - 1$) ring counter which counts a first clock signal and divides said writing cycle T with m, an N-notation ring counter which counts a second clock signal, a line memory of N×n bits which uses an output from the N-notation ring counter as address signals, a comparator which compares an image data outputted from the line memory with an output from the m-notation ring counter and outputs binary data in accordance with a comparison result therein, an N-bit shift register which receives as input said binary data in synchronism with said second clock signal and a driving circuit which feeds in parallel output from the N-bit shift register to said liquid crystal cells in the number N for driving the same.

2. The liquid crystal drive/control device as claimed in claim 1, wherein said liquid crystal cells are two lines.

3. The liquid crystal drive/control device as claimed in claim 1, wherein frequency of said first clock signal is lower than the same of said second clock signal 4. The liquid crystal drive/control device as claimed in claim 1, wherein said driving circuit comprising a latch circuit which latches the output from the N-bit shift register in synchronism with said first signal and a driver which inputs latched data in the latch circuit and transmits inputted data to said liquid crystal cells in synchronism with a third clock signal.

5. The liquid crystal drive/control device as claimed in claim 4, wherein said third clock signal is said first clock signal.

6. The liquid crystal drive/control device as claimed in claim 4, wherein driving voltages having three levels are applied to said driver.

7. A liquid crystal drive/control device which controls a liquid crystal shutter array at a writing cycle T comprising liquid crystal cells of N number to record an image of n-bit gradation on a photosensitive material, which comprises an m-notation ($m \leq 2^n - 1$) ring counter which counts a first clock signal and divides said writing cycle T by m, an N-notation ring counter which counts a second clock signal, a line memory of N×n bits which uses an output from the N-notation ring counter as address signals, a data table which is accessible with an image data outputted from the line memory and an output from said m-notation ring counter, an N-bit shift register which receives as input data outputted from said data table, and a driving circuit which feeds in parallel output from the N-bit shift register to said liquid crystal cells in the number N for driving the same.

8. The liquid crystal drive/control device as claimed in claim 7, wherein data table comprising an adder which adds the image data from the line memory and the output from said m-notation ring counter and a look-up table in which predetermined data are stored in advance.

9. The liquid crystal drive/control device as claimed in claim 8, wherein frequency of said first clock signal is lower than the same of said second clock signal 10. The liquid crystal drive/control device as claimed in claim 8, wherein said driving circuit comprising a latch circuit which latches the output from the N-bit shift register in synchronism with said first signal and a driver which inputs latched data in the latch circuit and transmits inputted data to said liquid crystal cells in synchronism with a third clock signal. 13. The liquid crystal drive/control device as claimed in claim 12, wherein said third clock signal is said first clock signal.

* * * * *